United States Patent
Smith et al.

(10) Patent No.: US 7,457,761 B2
(45) Date of Patent: Nov. 25, 2008

(54) DELIVERY MANAGEMENT SYSTEM

(75) Inventors: Timothy Jay Smith, Elizabethtown, KY (US); Terry Ray Stout, Louisville, KY (US); Jeffrey Allen Hume, Louisville, KY (US); Gregory Ellington, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,961

(22) Filed: Dec. 30, 1999

(65) Prior Publication Data
US 2004/0225507 A1  Nov. 11, 2004

Related U.S. Application Data

(60) Provisional application No. 60/163,298, filed on Nov. 3, 1999.

(51) Int. Cl.
*G01C 21/34* (2006.01)
(52) U.S. Cl. ............................ 705/6; 705/1
(58) Field of Classification Search ............ 705/27, 705/28, 37, 1, 26, 5, 6; 707/7, 100, 101, 707/104
See application file for complete search history.

(56) References Cited

U.S. PATENT DOCUMENTS

| | | | |
|---|---|---|---|
| 5,265,006 A | 11/1993 | Asthana et al. | |
| 5,557,515 A | 9/1996 | Abbruzzese et al. | |
| 5,963,915 A * | 10/1999 | Kirsch | 705/26 |
| 6,065,672 A | 5/2000 | Haycock | |
| 6,081,789 A * | 6/2000 | Purcell | 705/37 |
| 6,148,291 A | 11/2000 | Radican | |
| 6,151,582 A | 11/2000 | Huang et al. | |
| 6,304,856 B1 | 10/2001 | Soga et al. | |
| 6,318,289 B1 | 11/2001 | Pratt | |
| 6,370,521 B1 | 4/2002 | Pigos, Jr. et al. | |
| 6,417,871 B1 | 7/2002 | Nomura et al. | |
| 6,876,977 B1 * | 4/2005 | Marks | 705/26 |
| 6,963,847 B1 * | 11/2005 | Kennedy et al. | 705/8 |

(Continued)

FOREIGN PATENT DOCUMENTS

JP    2001297270 A    * 10/2001

(Continued)

OTHER PUBLICATIONS

James A. Senn, WISs at Federal Express, Jul. 1998, Communications of the ACM, vol. 41, No. 7, 2 pages.*

(Continued)

*Primary Examiner*—John W. Hayes
*Assistant Examiner*—Shannon Saliard
(74) *Attorney, Agent, or Firm*—George L. Rideout, Esq.; Armstrong Teasdale LLP

(57) ABSTRACT

The method of managing the delivery of an order from at least one supplier to a respective delivery agent, and from the delivery agent to a respective buyer, given a requested order date and the respective buyers address, consisting of the steps including: determining a first potential arrival date of the order at a respective delivery agents location based on the order request date and the buyer's address; calculating the capacity of the delivery agent to ship the order based the first potential arrive date request; and finally, determining when there is sufficient capacity to ship the order to the buyer's address.

38 Claims, 8 Drawing Sheets

U.S. PATENT DOCUMENTS 7,082,408 B1 * 7/2006 Baumann et al. .............. 705/26
2007/0162353 A1 * 7/2007 Borders et al. ................ 705/26

FOREIGN PATENT DOCUMENTS

WO     WO 01/13261 A1 * 2/2001

OTHER PUBLICATIONS

Henderson, Jay, "Salvaged Structures Offer Advantage in Turnkey Work", Nov. 1998, Offshore, 58, 11, 107 (2).*
Vernath, John, "Meeting Plant Engineering Project Schedules", Feb. 7, 1991, Plant Engineering, v45, n3, p. 82(6).*

* cited by examiner

FIG. 8

DELIVERY MANAGEMENT SYSTEM

CROSS REFERENCE TO RELATED APPLICATIONS

This application claims the benefit of U.S. provisional application No. 60/163,298, filed on Nov. 3, 1999.

This application is related to co-pending U.S. patent application, Ser. No. 09/475,630, entitled "Internet Based Goods Delivery System", filed on Dec. 30, 1999, assigned to the assignee of the present invention, and herein incorporated by reference. This application is also related to co-pending U.S. patent application, Ser. No. 09/475,962, entitled "Capacity Monitoring Process for A Goods Delivery System", filed on Dec. 30, 1999, assigned to the assignee of the present invention, and herein incorporated by reference.

BACKGROUND OF THE INVENTION

This invention relates to a delivery management system and more particularly to a Internet based delivery system that facilitates delivery date selection at the point of sale.

At least one other company has employed an Internet based goods delivery system wherein the goods can be ordered from one particular store and delivered to a designated buyer's address. For example Home Depot Company has employed an Internet based appliance delivery system for more than a year. This system enables a buyer to place an Internet based order for a branded good, and the respective good be delivered to the buyers designated address. Once the order is placed the order is sent to a respective delivery agent via the Internet. The respective delivery agent then delivers the respective good. As such, this good delivery system is an order fulfillment system. This system has a number of disadvantages, including, for example: the system can not automatically generate order reschedules resulting from refusals, "cancellations", "damaged goods", "suspends", and "shorts"; nor is there a feature that adjusts the scheduling of deliveries based on the good delivery capacity.

Delivery management systems are known that provide Internet based delivery of standard sized packages, one particular example is the FEDERAL EXPRESS® goods delivery system. In this specification non-standard sized packages are packages that are not delivered by air carriers and mail delivery services, and typically are packages that weigh over about 100 lbs. (45 kg). The delivery of non-standard size packages generally requires a delivery agent who is equipped to ship and install the delivered goods. For example, there currently exists a plurality of appliance delivery services that receives the appliance from the appliance manufacturer, delivers and installs the appliance after the purchaser has ordered the appliance from a local appliance store. This entire operation is manually executed based on a delivery manifest. The delivery manifest is typically a document identifying the delivery agent's goods shipment schedule.

It is desirable to employ an Internet based goods delivery system where all parties can place orders, exchange orders, wherein the same information is available to each user on a near instantaneous basis while minimizing the need for direct human interaction. It is desirable to provide a system where workload capacity can be determined by geographic area to insure successful delivery. It is also desirable to segregate geographic areas and to allow for sharing of delivery slots to maximize utilization of the delivery agent's total capacity. It is also desirable to allow for scheduling of deliveries and assignment of deliveries as the delivery agent desires to maximize productivity. It is also desirable to employ a goods delivery system that can accommodate the rescheduling of orders and goods. Finally, it is desirable to provide a goods delivery system that can be modified to maximize the delivery efficiency by having the system accommodate changing delivery capacity.

BRIEF SUMMARY OF THE INVENTION

Briefly, therefore, this invention provides for a method of managing the delivery of goods from a supplier to a buyer utilizing a system having at least one delivery agent, at least one store, at least one manufacturer, and a plurality of buyers, wherein the at least one delivery agent, at least one store, and the at least one manufacturer are coupled to a communications network. The method of managing the delivery of an order from at least one supplier to a respective delivery agent, and from the delivery agent to a respective buyer, given a requested order date and the respective buyers address, comprises the steps of: determining a first potential arrival date of the order at a respective delivery agents location based on the order request date and the buyer's address; next, calculating the capacity of the delivery agent to ship the order based the first potential arrive date request; and finally, determining when there is sufficient capacity to ship the order to the buyer's address.

BRIEF DESCRIPTION OF THE DRAWINGS

FIG. 8 is one exemplary illustration of a computing unit display screen at a point-of-sale location.

DETAILED DESCRIPTION OF THE INVENTION

Figure 1:
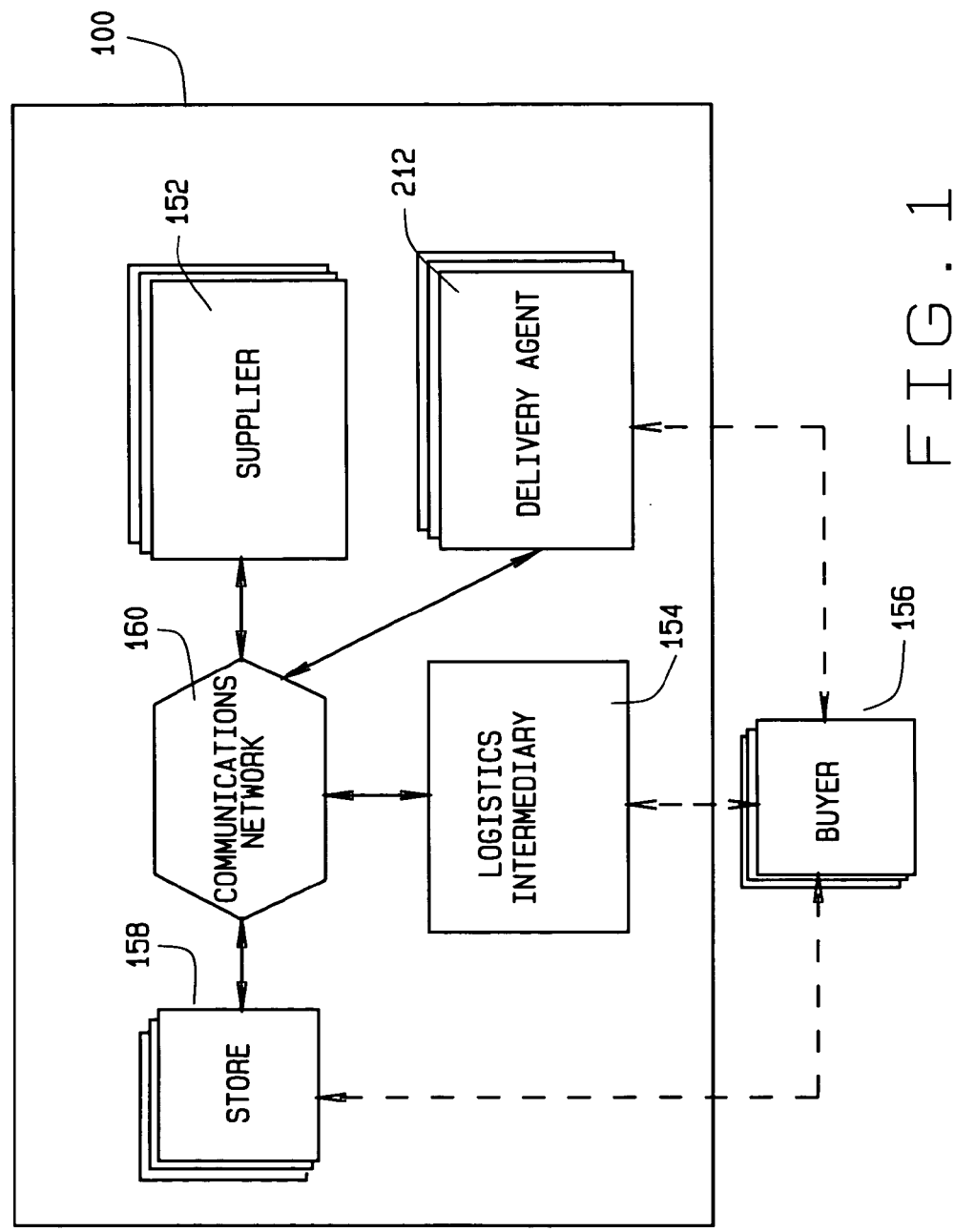
FIG. 1 is an illustration of the communication interchange between components of the goods delivery system of the present invention.
Figure 2:
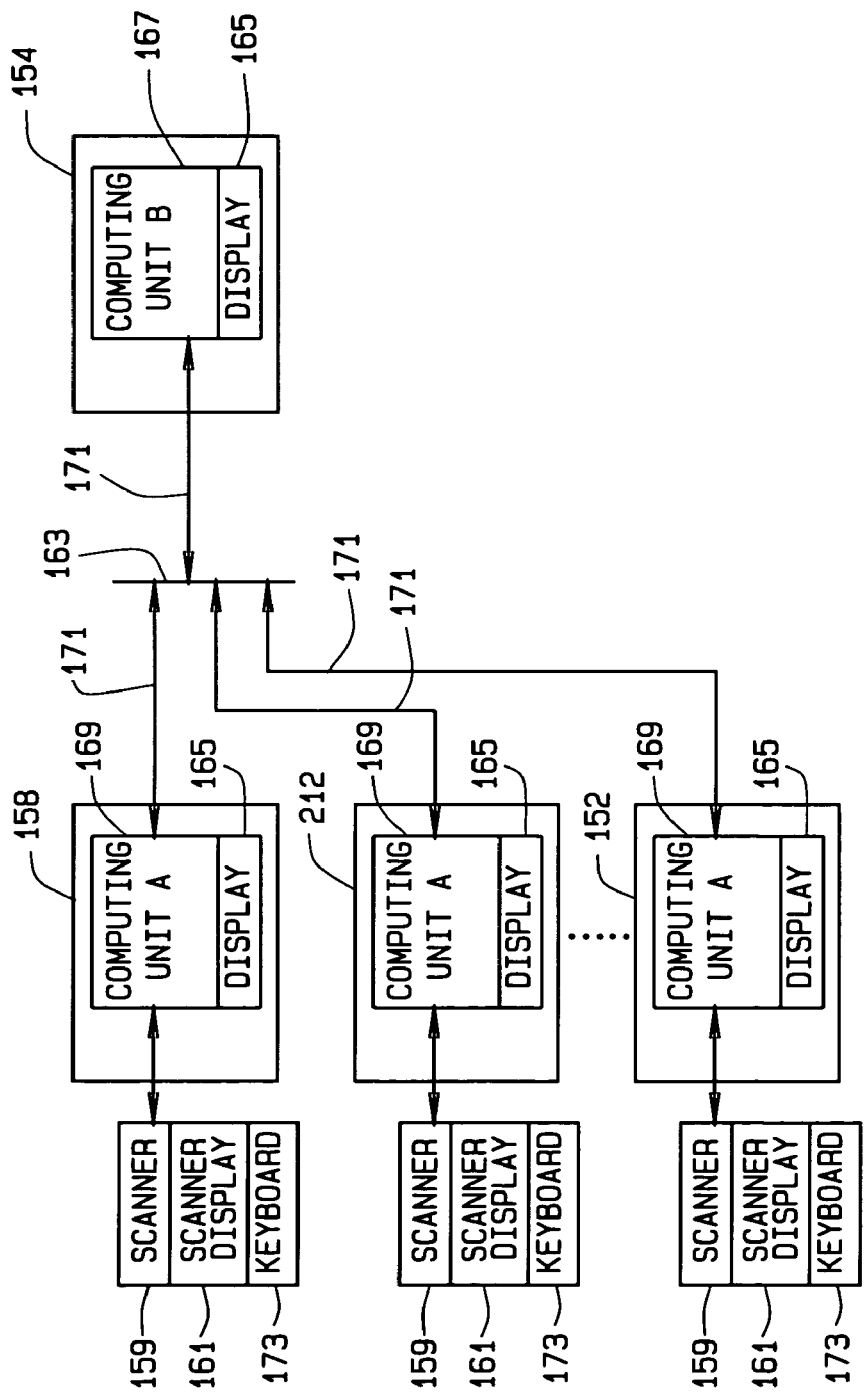
FIG. 2 is an further illustration of an Internet based communications network and associated elements illustration in FIG. 1.

Now referring to FIGS. 1 and 2, which illustrate the major components comprising goods delivery system 100, wherein like reference numbers identify like elements, goods delivery system 100 comprises components that cooperate in a process that integrates logistical supply chain parties by utilizing the Internet, commercially available scanners, and Internet based programs. The system creates the capability for a product distribution supplier to seamlessly interact with sellers of the supplier's products and suppliers to the sellers and buyers. Each supplier to the seller, and alternatively, to the buyer, is hereinafter defined as a delivery agent 212. All parties of the above identified logistical supply chain may execute roles and responsibilities while minimizing human interaction between the parties.

Goods delivery system 100 comprises at least one supplier 152, at least one delivery agent 212, a logistics intermediary 154, at least one store 158, and communications network 160. Additionally, a respective buyer 156 can interface with goods delivery system 100. Buyer 156 typically places an order at a respective store 158 requesting a desired good to be shipped, a desired delivery date, and a desired installation service. At each store 158 delivery agent 212 and supplier 152 there is at least one computing unit A 169, which is coupled to a computing unit B 167 via communications network 160. In one embodiment, communications network 160 comprises a Internet based communications link 171 and a web server 163. Communications link 171 may use audio and alternatively fiber optic communications means to support server 163 based communications. In one embodiment computing unit A 169 and computing unit B 167 communicate using the Transmission Control Protocol/Internet Protocol (TCP/IP). Server 163 is typically a Internet based server which interfaces with a plurality of browsers so as to effect Internet based communications. One exemplary server is the Netscape Application Servers™. Computing unit A 169 and computing unit B 167 comprises a respective browser. One exemplary browser is the MICROSOFT INTERNET EXPLORER 4.0™. Computing unit A 169 may also comprise a commercially available display 165 and a commercially available scanner 159. Scanner 159 also has a scanner display 161, a keyboard 173, and is adapted to interface with computing unit A 169.

In an exemplary embodiment the server may be accessed by a respective computing unit A 169 and computing unit B 167 by providing a web address having a registered Uniform Resource Locator (URL) hyperlink "www.geappliances.com" and by providing an associated password on most commercially available web browsers. Computing unit B 167, located at logistics intermediary 154, houses the software which comprises a delivery management system. It is noted that the delivery management system may be located at any component of the goods delivery system, including, for example, store 158, delivery agent 212, and supplier 152. The delivery management system provides a delivery management control process that effectuates control and enables information storage for goods delivery system 100. Additionally delivery management system 200 of the present invention may comprise a computer program storage medium readable by a computer system and encoding a computer program of instructions for executing a computer process for managing a goods delivery system.

The delivery management system facilitates the scheduling of all deliveries from supplier 152 to buyer 156 by delivery agent 212, based on the delivery date selection at the point-of-sale. The point-of-sale may, by way of example and not limitation, be respective store 158, respective supplier 152, respective delivery agent 212, or respective buyers delivery address. Copending U.S. patent application 9D-EC-19310, (Ser. No. 09/475,630) provides details of the Internet based goods delivery system. Copending U.S. patent application 9D-EC-19319, (Ser. No. 09/457,962) provides details of the capacity tracking system portion of the delivery management system.

Figure 3:
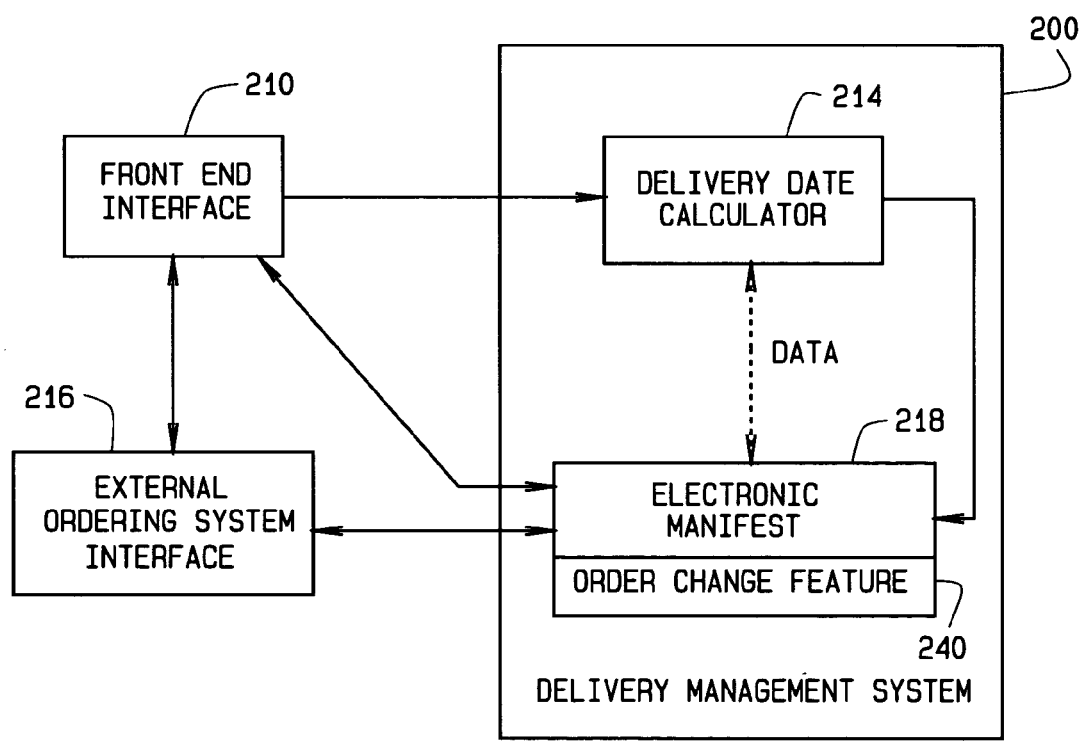
FIG. 3 is a block diagram of the delivery management system of the present invention.

A delivery management system block diagram 200, as illustrated in FIG. 3, provides the process that controls the goods delivery system described in co-pending U.S. patent application, 9D-EC-19335 (Ser. No. 09/475,961). Delivery management system 200 facilitates the scheduling of all deliveries from suppliers, to delivery agent locations, then to the buyer or store regardless of good supplier while allowing for delivery date selection at the point-of-sale. Scheduling is performed by day at a zip code and alternatively at a zip group level. Delivery management system 200 provides several benefits at the delivery agent interface, the point-of-sale interface, the store interface, and the logistics intermediary interface all of which are further described below.

At the delivery agent interface the following benefits are realized with the present invention. The user has the ability to set workload capacity by geographic area to insure successful delivery on the selected delivery date chosen at the point-of-sale. The user is defined in this specification to be delivery agent 212, store 158, logistics intermediary 154, supplier 152, buyer 156, and any agent acting in the capacity as the user in the identified list. For example, the agent may be a manager, a representative, or a viewer of the information only. The user has the ability to segregate geographic areas and allow for "sharing" of delivery slots to maximize utilization of the delivery agent's total capacity. The buyer has the ability to buy various branded goods from a plurality of suppliers. The delivery agent may tailor workload capacity by day of the week and has the ability to limit or corresponding expand delivery capacity on holidays and special events. Additionally, the delivery agent may schedule deliveries and assign delivery vehicles as desired to maximize productivity.

At the point-of-sale interface the following benefits are realized with the present invention. The buyer has delivery date selection capability at the time of purchase. The available delivery dates are presented in a standardized format. Order status tracking and order update capabilities are provided. At the store interface accurate order tracking is made available. Order changes may be efficiently made without cumbersome phone contact with the delivery agent.

At the logistics intermediary interface the following benefits are realized. The delivery agent has access to the Internet based delivery management system. The delivery agent also has the ability to monitor capacity, usage, and capacity needs to optimize delivery management.

Delivery management system 200, as illustrated in FIG. 3, comprises a delivery date calculator 214 and an electronic manifest 218. Delivery date calculator 214 determines the next available good delivery date from a respective suppler 152 to a respective buyer 156 or store 158 given a requested goods order. Electronic manifest 218 comprises ship schedules of each respective supplier 152, ship schedules of each delivery agent 212, capacity schedules for each delivery agent 212, special information from each delivery agent 212, delivery zones for each delivery agent 212, zip codes groups for respective delivery zones, and work unit data from each suppler further described below. Further delivery management system 200 includes features that enable order changes to be made with order change feature 240. By way of example and not limitation, order reschedules, ship to schedule changes, capacity schedule changes, zip code groups changes, work unit changes, delivery zone changes, overbooking capacity changes, and special information changes, may be made. The order may loaded from a front end interface 210 which comprises a Internet Web based interface, or a CICS system interface, or the like. Electronic manifest 218 may also communicate with a specially designed external ordering interface 216. External ordering interface 216 may be employed by stores having a separate delivery control system from which delivery management system 200 interfaces. By way of example and not limitation, external ordering interface 216 may operate as a Order entry interface, a Point-of-delivery interface, and alternatively a Order entry windows interface. Front end interface 210 and external ordering interface 216 are commercial based computer system interfaces provide the protocol necessary to transfer data between delivery management system 200 and a plurality of computer systems that may operate using computer languages not compatible with delivery management system 200.

A supplier ship schedule defines the daily frequency that supplier 152 will ship goods to each respective delivery agent 212. For example, respective supplier 152 may ship goods to respective delivery agent 212 every Monday, Wednesday, and Friday. This schedule also includes a delay feature which accounts for the time interval from arrival at the delivery agent's dock through the time that the good is available to be shipped to buyer 156. This delay feature, in effect, is a variable that can be modified to account for transit time and unloading time from supplier 152 to delivery agent 156. Table 1 illustrates one exemplary supplier ship schedule. The first row identifies the day the order is processed, which in this example can occur on any day from Monday through Sunday. The next row identifies the day the order is shipped from supplier 152. In this case it is based on a Tuesday and Thursday ship schedule and incorporates a 24 hour order processing delay. As such, for example, a Monday order will ship on Tuesday and a Tuesday order will ship on Thursday. Row three identifies the day the order arrives at the respective delivery agent's location. In this example 48 hours of delay are added to allow for transit time. Additionally, row four is the delay before the good is available for shipping from respective delivery agent 212 to buyer 156. As such, in this example, a Monday order will be available for shipment to buyer 156 on Friday and a Tuesday order will be available for shipment on the following Tuesday. It is understood that any shipping schedule may be used. Supplier 152 typically generates a unique shipping schedule for each delivery agent 212. The respective supplier ship schedule is loaded into electronic manifest 218 and can be modified at any time by respective supplier 152.

TABLE 1

Supplier Ship Schedule

| Order | Mon | Tue | Wed | Thu | Fri | Sat | Sun |
| --- | --- | --- | --- | --- | --- | --- | --- |
| Ship from Supplier | Tue | Thu | Thu | Tue | Tue | Tue | Tue |
| Arrive at delivery agent | Thu | Mon | Mon | Thu | Thu | Thu | Thu |
| Delay | Fri | Tue | Tue | Fri | Fri | Fri | Fri |

A delivery agent capacity matrix defines the delivery capacity and schedule for a defined delivery area to be served by delivery agent 212. Delivery agent 212 will have generated a capacity matrix residing in electronic manifest 218 for each zone associated with the delivery agent's delivery area. The delivery area is identified as a zone in this specification. A zone is the broadest geographical area of a delivery agent's territory and comprises a zip code set, the zip code set comprising at least one zip code. Within the territory of delivery agent 212 there is at least one shipping zone. Within each zone there is at least one schedule type, also identified as a zip group. The zip group within a zone comprises at least one zip code, the respective zip code also being a subset of the zip code set of the zone. Delivery agent 212 may choose to select and arrange zip groups so as to be able to vary service levels and vehicles or work crews. For each zip group within a zone, the delivery agent designates a maximum number of delivery slots for each delivery day, called the group maximum, each delivery slot representing the respective delivery agent's delivery capacity for the day. For example, Table 2 is an illustration of one exemplary delivery agent capacity matrix for a zone. Row one identifies the day of the week. Row two identifies the zone maximum for each respective day. In this example the zone maximum number is 30 representing the total number of work units with the delivery agent's vehicles can deliver in a day. For example, if this delivery agent has 3 vehicles and each vehicle can delivery 10 slots, then the delivery agent can deliver a total of 30 slots.

TABLE 2

Delivery agent capacity matrix for a zone

|  | Mon | Tue | Wed | Thu | Fri | Sat | Sun |
| --- | --- | --- | --- | --- | --- | --- | --- |
| Total slots for zone | 30 | 30 | 30 | 30 | 30 | 10 | 0 |
| Zip group 1 slots | 30 | 30 | 30 | 30 | 30 | 0 | 0 |
| Zip group 2 slots | 30 | 0 | 30 | 0 | 30 | 0 | 0 |
| Zip group 3 slots | 0 | 10 | 0 | 10 | 0 | 10 | 0 |
| Total opportunities | 60 | 40 | 60 | 40 | 60 | 10 | 0 |

The delivery agent has two levels of geographical division, the first is the ability to select various zones within a delivery area and the second is the ability to select zip groups within a zone. This feature gives the delivery agent the flexibility to subdivide a delivery area according to a logical shipment pattern and also the ability allocate delivery capacity based on resource limitations. For example again assume that the delivery agent has three vehicles designated for a delivery zone and the delivery zone can be subdivided into three zip groups. Assume further that zip groups one and two are easily accessible and zip group three is not. Any of the three vehicles may be assigned to zip groups one and two, but it is desirable to assign no more than one vehicle to deliver goods to zip group three. Assume further that zip group one will have deliveries made Monday through Friday, zip group two will have deliveries made on Monday, Wednesday, and Friday only, and that zip group three will have deliveries made only on Tuesdays, Thursdays, and Saturdays. The example in Table 2 illustrated the capacity matrix for this scenario.

In the example illustrated in Table 2 the zone maximum for Monday through Friday is 30 and the zone maximum is 10 on Saturday because of the delivery limitation for zip group 3. Since zip groups one and two can have three vehicles assigned they each may be allocated 30 slots, also identified as the zip group maximum. It should, however, be noted that the zip group maximum for any one zip group cannot exceed the zone maximum for that day. Each zip group is activated for a given day by selecting a zip group maximum which designates the number of slots that a given zip group can select from the zone maximum. A zero zip group maximum deactivates a zip group for that day of the week. The total number of individual zip group maximums may exceed the zone maximum and is identified in this specification as the total opportunities in row five. The present invention also has the ability to override zone and zip group maximums by date. This feature enables the delivery agent to use available delivery slots within areas where the "sharing" of slots is logistically feasible, while allowing the flexibility to create areas that, due to geographical challenges or business channel needs, can be isolated from the other areas and not subject to the "sharing" of slots. Delivery agent 212 and alternatively logistics intermediary 154 also has the ability to override the zip group maximum on holidays or special days by identifying the day and the limitation. This feature insures that the proper selection criteria and display are presented at the point-of-sale.

The work unit is a multiplication factor associated with each item to be shipped in an order. The work unit incorporates two features including the size of the appliances associated with a delivery load and the degree of difficulty of installation to equalize delivery slots associated with each capacity matrix. Table 3 is an illustration of the work units calculations to equalize the slot designation for each respective item that is shipped. Also supplier 152 can determine the number of slots that will be filled by a single delivery. By way of example, a 48 foot truck can hold up to about 114 slots and a 53 foot truck can hold up to about 126 slots. Table 3 illustrates one example of the number of appliance goods to fill a 53 foot truck and the associated number of slots. The number of appliance goods types include a range, a model A refrigerator, a model B refrigerator, and a dishwasher. Supplier 152, typically generates a work unit matrix associated with the model type of each good that supplier 152 provides. The work unit matrix resides in electronic manifest 218.

TABLE 3

Work units conversion to slots

| Item | Work units per item | Quantity | Number of slots this quantity will fill |
|---|---|---|---|
| Range | 1.5 | 14 | 21 |
| Refrigerator model A | 3.0 | 14 | 42 |
| Refrigerator model B | 3.5 | 14 | 49 |
| Dishwasher | 1.0 | 14 | 14 |
| Full load Total | | | 126 |

Figure 4:
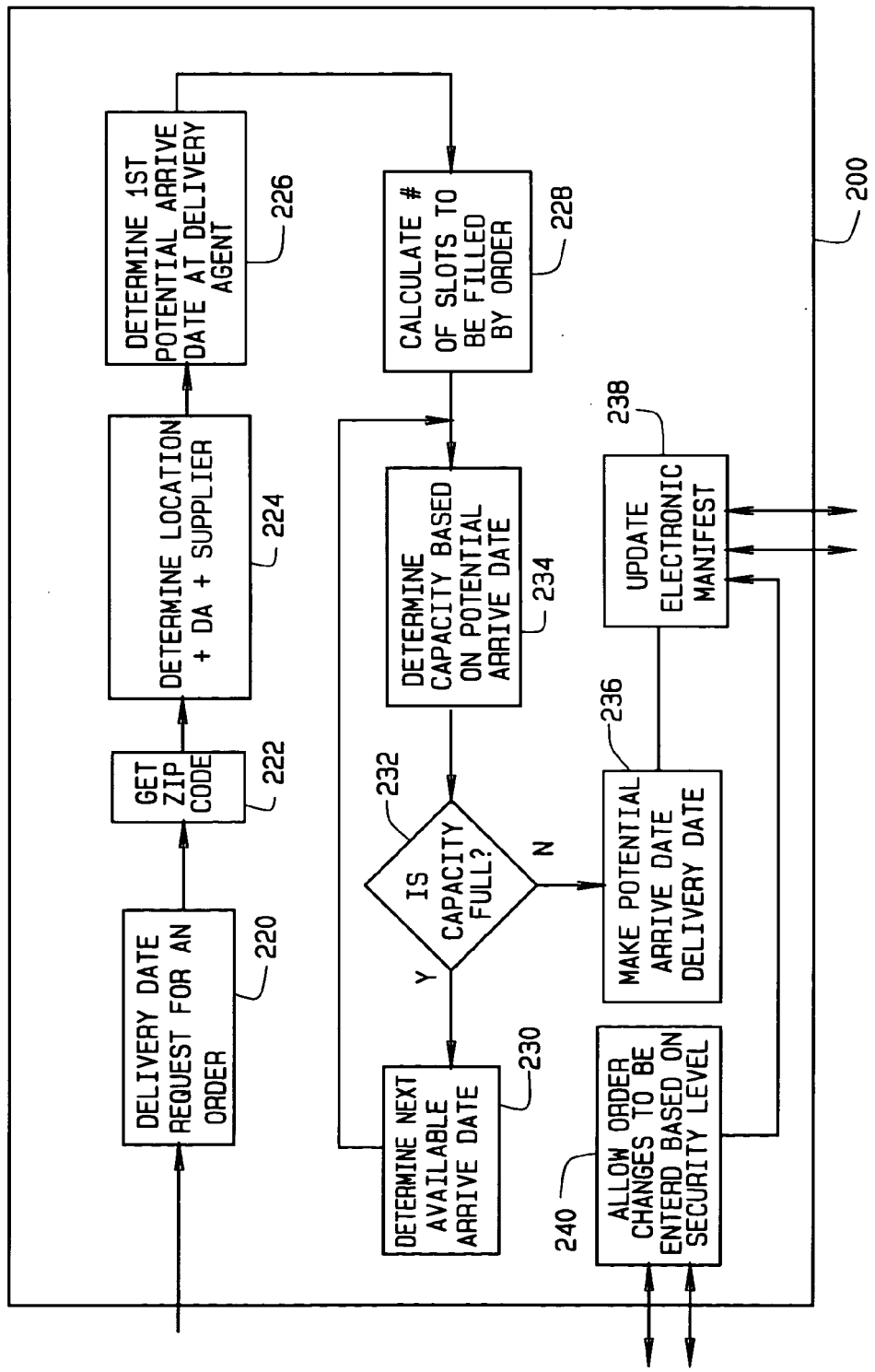
FIG. 4 is a process flow diagram of the delivery management system of FIG. 3.
Figure 5:
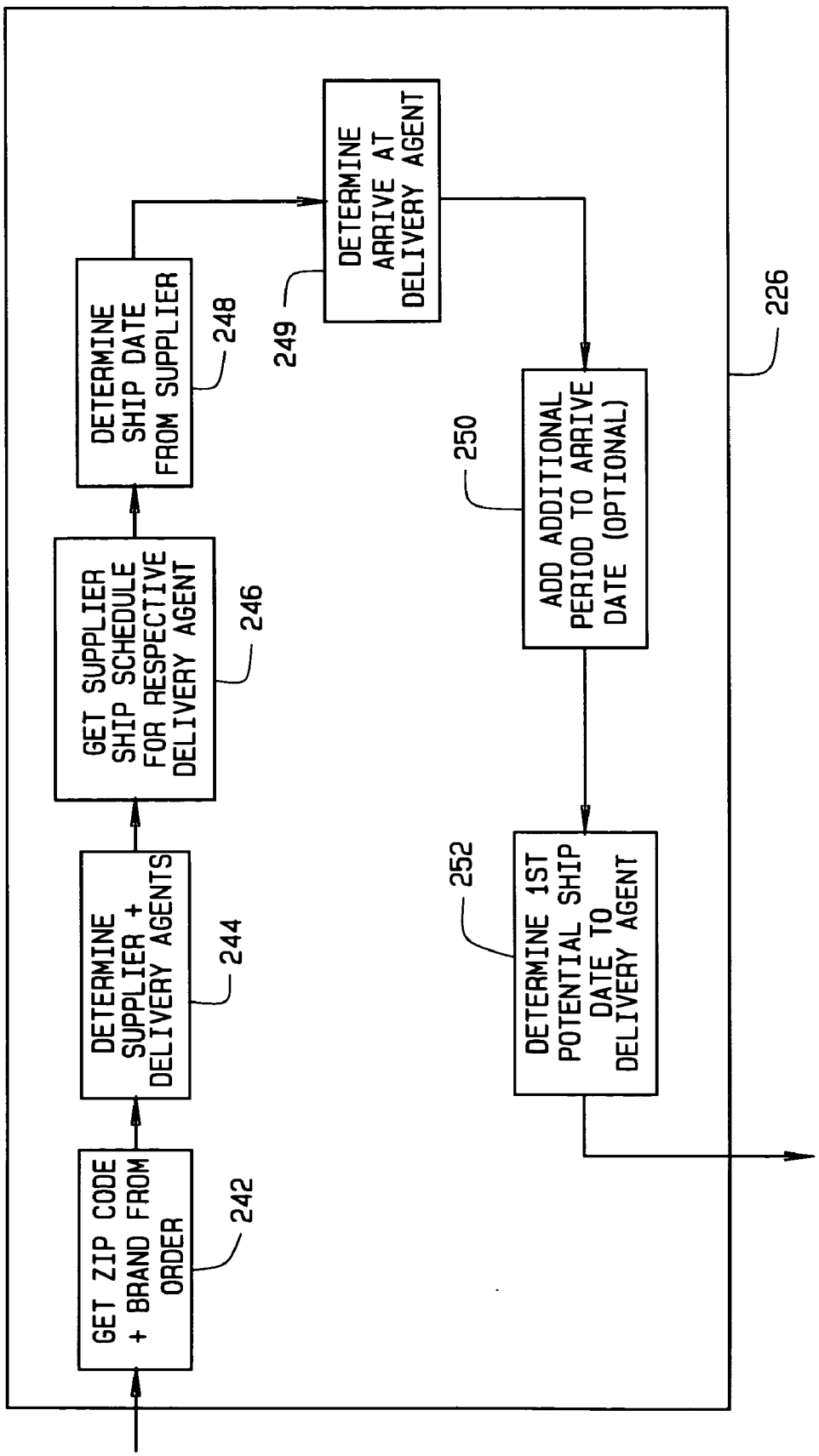
FIG. 5 is a process flow diagram of selecting the potential delivery date of the capacity flow diagram of FIG. 4.
Figure 6:
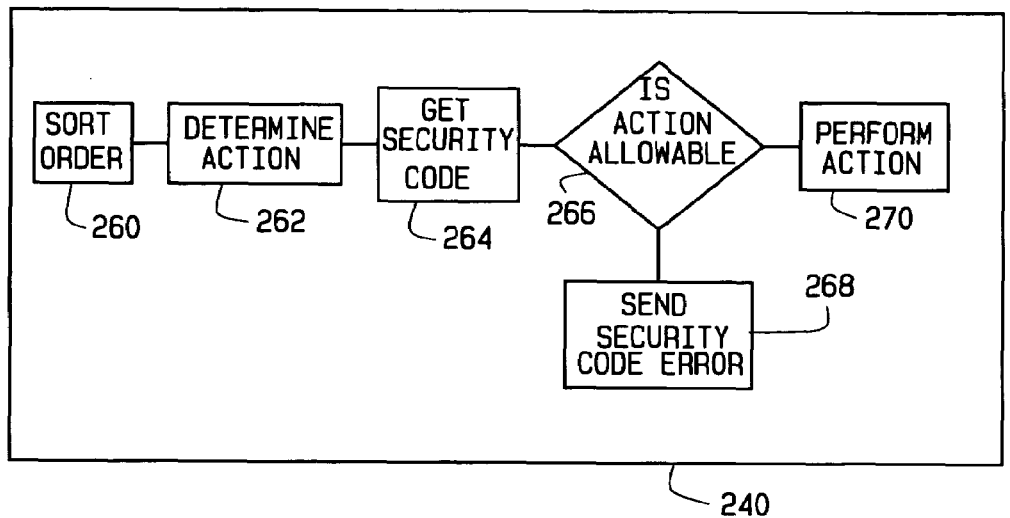
FIG. 6 is a process flow diagram of the order change process of FIG. 4.

FIGS. 4 through 6, wherein like reference numbers identify like elements, illustrate the process of the delivery management system of the present invention. FIG. 4 shows the process of delivery management system 200 identified in FIG. 3. First a delivery date is requested for a respective brand of good, indicated in step 220. Next the zip code of the ordered good is retrieved, step 222. Next, the location of the delivery is determined from the zip code, step 224. The location also identifies the delivery agent to be selected. The brand of the good is used to identify the supplier ship schedule to be used. Next, the first potential arrival date of the order to the selected delivery agent is calculated, step 226. It is understood that the information described above is generally entitled order information, which may comprise, by way of example and not limitation, the order date, the model number, the quantity of items, the brand of the item, the service to be selected, the requested delivery date, the buyer's delivery address, security level clearance information, status information, and the like. Next, the number of slots to be used is calculated, step 228. Next, the delivery agent's change in capacity for the potential arrival date is calculated based on the order size, step 234. Next, a determination is made as to whether delivery agent 212 has the capacity to ship the order on the identified date, step 232. If delivery agent 212 has the capacity, the potential arrival date is identified as the delivery date, step 236. And finally, the electronic manifest is updated to include the shipment, step 238. If the capacity of delivery agent 212 cannot accommodate the order the next available ship date is selected, step 230. The capacity is recalculated utilizing the full capacity of the previous date and the capacity of the newly selected date, step 234. These steps are repeated until the complete order can be delivered, step 232. When the complete order can be delivered the potential arrive date is selected as the delivery date, step 236 and the electronic manifest is updated as before, step 238.

The step of determining the first potential arrival date of the order to the selected delivery agent, step 226, is further illustrated in FIG. 5. The brand of the order and the zip code is selected from the order information, step 242. Next, the appropriate delivery agent and supplier is selected based on the zip code and brand, step 244. The appropriate supplier ship schedule is selected based on the zip code and the brand, step 246. Next, the ship from supplier date is determined based on the order date, step 248. Next, the arrival at the delivery agent date is determined based on the ship from supplier date obtained from the supplier ship schedule, step 249. Next, a delay is added to the delivery agent arrival date, step 250. This date is the first potential ship date to the delivery agent.

One exemplary embodiment, illustrates this process. For example, for an order of brand Y to be shipped to zip code X (e.g. zip code X is associated with zip group 2 of Table 2) a supplier ship schedule (Table 1) is selected and a delivery agent based on zip code X and the brand Y. If the order is received on Monday, the ship from supplier date is Tuesday, the arrive at delivery agent location date is Thursday, and the available for shipment to buyer date is Friday, steps 242 through 252 respectively. Friday, therefore, is the first potential arrive date at the delivery agent location.

Once the first potential arrive date is determined the capacity matrix associated with the number of slots is determined, the number of slots is calculated as described above, step 228. Once the number of slots have been determined the capacity is determined, step 234. For example, assume first that zip group 1 in Table 2 has 20 of 30 slots allocated leaving 10 slots of available ship capacity to either zip group 1 or zip group 2. If the number of slots are calculated to be 40 and the available for shipment to buyer date is Friday and zip group 2 is the associated zip group coupled to zip code X. The shipping capacity for Friday is 10 slots, so the next available ship date is the following Monday. The shipping capacity for Friday is set to 100% and the shipping capacity for Monday is calculated to be 30/30 or 100 percent for the zone since the zone capacity for any day is only 30 units. The electronic manifest 218 is updated showing a ship date of Monday and also showing that the capacity for Friday and Monday are full for the associated delivery agent, step 238. Note that copending U.S. patent application 9D-EC-19319, (Ser. No. 09/475,962) provides details of the capacity calculating and tracking portion of the delivery management system.

Figure 9:
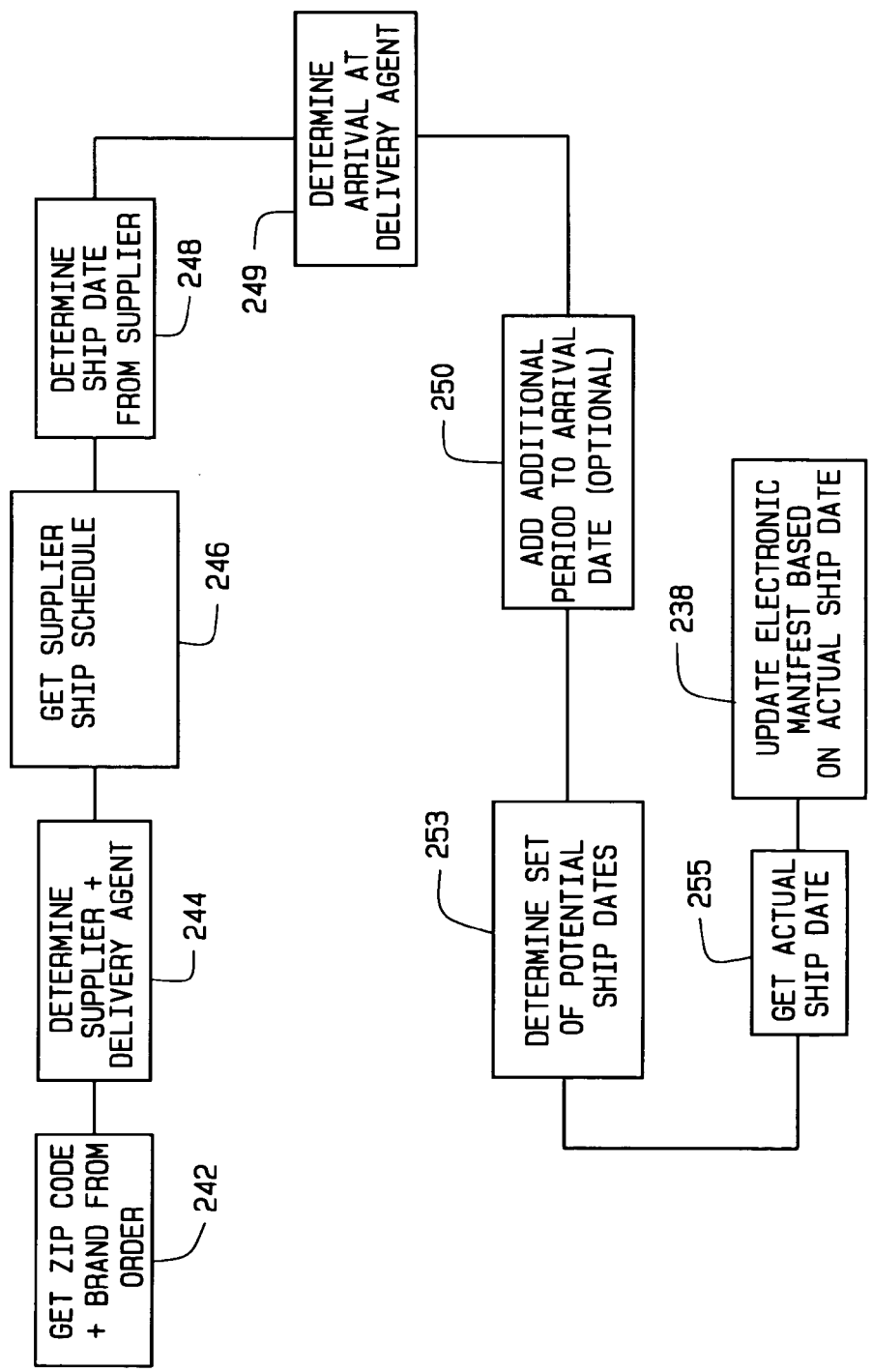
FIG. 9 is an alternative process flow diagram of the delivery management system of FIG. 3.

In an alternative embodiment of the present invention, as illustrated in FIG. 9, a range of potential delivery days are provided for the user to chose from. When the user selects the actual shipment date from the range of potential dates electronic manifest 218 (FIG. 3) is updates taking into account the added capacity. First, the brand of the order and the zip code is selected from the order information, step 242. Next, the appropriate delivery agent is and supplier is selected based on the zip code and brand, step 244. The appropriate supplier ship schedule is selected based on the zip code and the brand, step 246. Next, the ship from supplier date is determined based on the order date, step 248. Next, the arrival at the delivery agent date is determined based on the ship from supplier date from the supplier ship schedule, step 249. Next, a delay is added to the delivery agent location arrival date, step 250. This date is the first potential ship date to the delivery agent. The number of days from the first potential ship date to the day capacity is first available going backwards in time is the range of potential delivery days, also identified as the set of potential ship dates, step 253. Next, the user selects the actual ship date from the set of potential shipment days, step 255. Finally, electronic manifest 218 is updated to include the actual ship date, step 238. The system capacity is also updated based on the selected shipment date. Note, that this set of days is determined in copending U.S. patent application 9D-EC-19319, Ser. No. (09/475,962).

Figure 7:
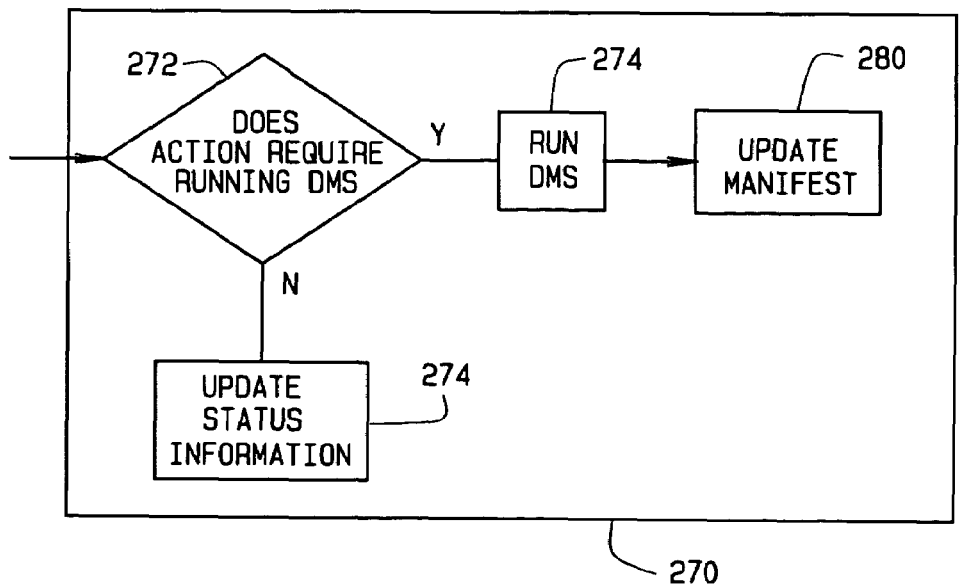
FIG. 7 is a process flow diagram illustrating further details of the order change process of FIG. 6.

Another feature of delivery management system 200 is the order change feature illustrated in FIGS. 6 and 7, wherein like reference numbers identify like elements. First the order is sorted, step 260. The order may be sorted based on any item identified in the order information or any calculated result, for example, the order may be sorted by zip group, zone, truck number, stop number, etc. Next, the action to be preformed is determined, step 262. Next, a security code is obtained either from a database or by being requested of the user attempting to make the change, step 264. A security level clearance is made to determine whether the change requested is allowable, step 266. For example, Table 4 identifies one exemplary matrix of change options available at each change request level. In Table 4 the letter "M" indicates only a person having management authority can make the change. This security level typically requires the input of a password. The letter "R" indicates that any representative has the authority to make changes. This feature would typically be determined by an internal code which identifies the type of use. The letter "X" indicates that no change authority exists and the information can only be reviewed by the party. If the security code was not recognized a security code error flag may be generated, step 268. Next, the action is performed, step 270.

FIG. 7 is a more detailed illustration of the process flow of step 270. First, it is determined whether the action requested requires that delivery management system (DMS) 200 be executed, step 272. For example, when an reschedule request is generated it requires that a new delivery date be determined and the old delivery date to be canceled. Next, DMS 200 is executed, step 274. Finally, electronic manifest 218 is updated. Table 4 has (*) indicating which change features require that DMS 200 be executed, step 272.

TABLE 4

Order change authorization matrix

| Type of order change | Logistics intermediary | Store | Supplier | Delivery agent | Buyer |
|---|---|---|---|---|---|
| Order reschedule* | M | R | R | M | X |
| Ship schedule changes* | M | R | R | M | X |
| Capacity matrix changes* | M | X | X | M | X |
| Special information changes | R | R | R | R | X |
| Zip code group change | M | X | X | M | X |
| Order complete | M | X | R | R | R |
| Work unit data changes* | R | X | X | M | X |
| Delivery zone changes | M | X | X | M | X |
| Cancel order* | M | R | R | R | X |
| Replace order* | M | M | R | M | X |
| Overbook capacity matrix* | M | M | X | M | X |

Figure 8:
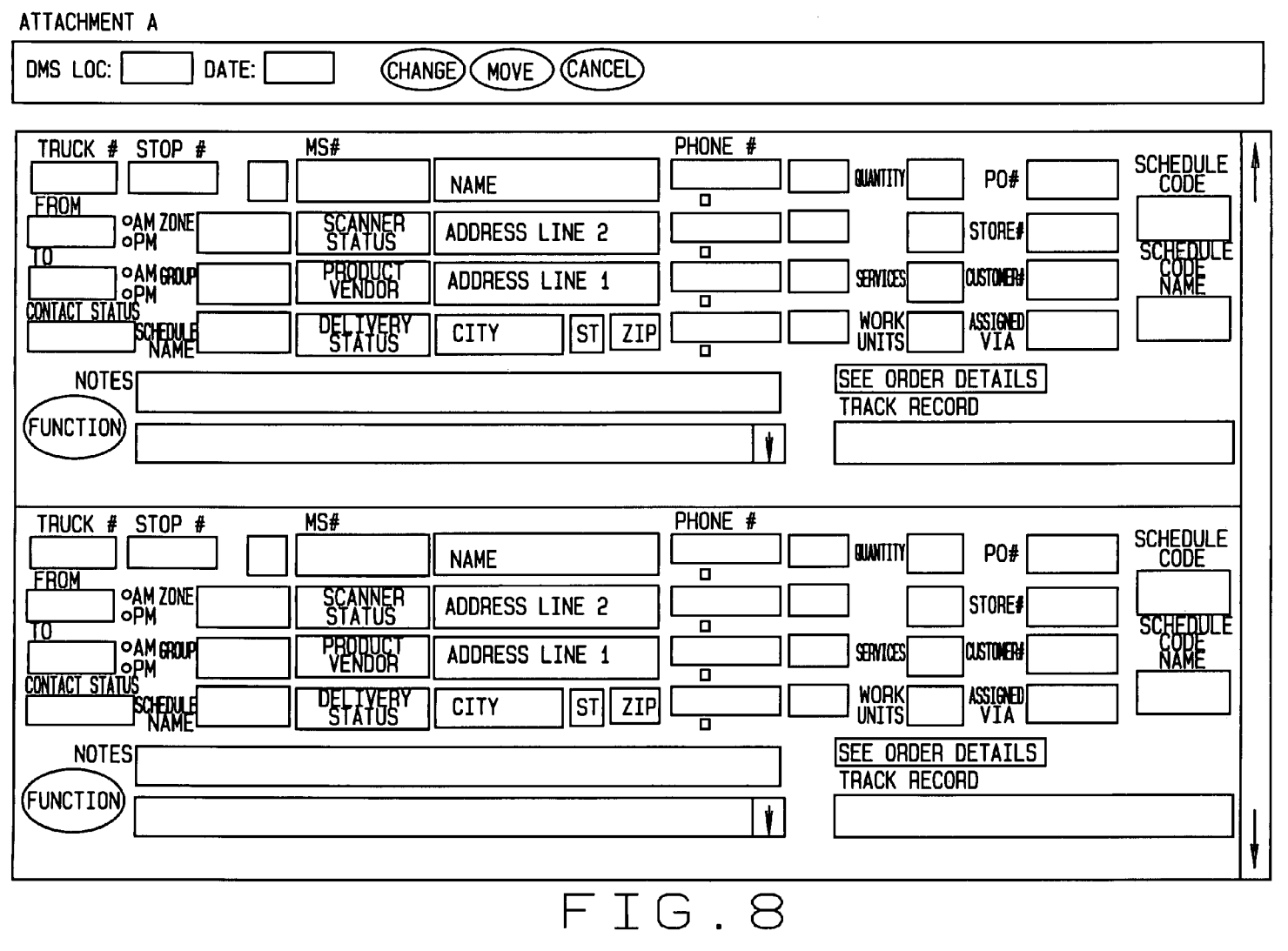

FIG. 8 is a exemplary illustration of a terminal display of computing unit A 165 (FIG. 2) at a delivery agents location. This display comprises, by way of example and not limitation, a DMS location (i.e. city code), current date, change order selector button, move order selector button, cancel selector button, truck number, delivery stop number, delivery from, delivery to, buyer contact status, master schedule number, zone, zip group, schedule name, buyer address, buyer phone number including work, home, other, quantity of goods, services to be performed at the buyers address, a purchase order number, a store number, a customer (buyer) number, assigned via, a schedule code, and a schedule code name. The screen may be adapted to show several sets of the above described information and to scroll between any variety of sets of the above described information. Status information is defined as information that does not require the running of delivery date calculator 214 (FIG. 3). By way of example and not limitation, status information is, a DMS location (i.e. city code), current date, truck number, delivery stop number, buyer contact status, master schedule number, zone, zip group, schedule name, buyer address, buyer phone number including work, home, other, a purchase order number, a store number, and a customer (buyer) number. In an alternative embodiment a second screen may comprise change order selector button, move order selector button, and cancel selector button.

The present invention comprises delivery management system 200 having components that cooperate in a process that integrates logistical supply chain parties by utilizing the Internet. The system creates the capability for a product distribution supplier to seamlessly interact with sellers of the supplier's products and suppliers to the sellers and buyers. All parties of the logistical supply chain execute roles and responsibilities while minimizing human interaction between the parties. The goods delivery system 100 comprises a plurality of stores 158, suppliers 152, at least one delivery agent 212, and a logistics intermediary 154, which all interact via communications network 160, as illustrated in FIG. 1. Goods delivery system 100 utilizes delivery management system 200, identified in FIG. 3 to facilitate the scheduling of all deliveries from suppliers 152, to delivery agents 212, then to buyers 156, while allowing for delivery date selection at the point-of-sale. Order changes may also be made by respective parties while at the same time allowing contemporaneous status review by all parts.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of managing a delivery schedule of an order using a system configured with a server which includes a goods delivery system, the system including at least one computing unit networked to the server, the order being delivered from at least one supplier to a respective delivery agent, and from the respective delivery agent to a respective buyer, wherein the order comprises order information, said method comprising the steps of:
   (1) calculating a first potential arrival date of the order to a respective delivery agent's location using the server system networked to the computing unit based on an order request date, a respective buyer's address, and a fixed delay;
   (2) generating a work unit matrix, wherein each work unit in the work unit matrix is a multiplication factor of a size and a degree of difficulty of installation associated with each item in the order;
   (3) determining a number of delivery slots needed for the order by multiplying, each item in the order by a work unit selected from the work unit matrix;
   (4) determining an ability of the respective delivery agent to ship the order based on the first potential arrival date and the number of delivery slots;
   (5) determining a delivery date to the respective buyer when there is sufficient delivery agent capacity to ship the order to the respective buyer's address;
   (6) updating an electronic manifest indicating the delivery date of the order and a change in delivery agent capacity for the delivery date; and
   (7) determining whether an order change that affects the delivery date of the order has been requested, wherein the request is made by a user that is authorized by one of the respective delivery agent, the respective buyer, the at least one supplier, a store, or a logistics intermediary, wherein allowance of the order change is based on: (a) a type of order change, (b) whether the user is acting as the respective delivery agent, the respective buyer, the at least one supplier, the store, or the logistics intermediary, (c) a level of the user, and (d) a security code, wherein, upon allowance of the order change, steps (1), (2), (3), (4), (5), and (6) are repeated to determine a new delivery date.

2. The method of managing the delivery schedule as recited in claim 1, wherein the step of determining a delivery date to the respective buyer when there is sufficient capacity to ship the order further comprises the step of determining a first available date to completely ship the order to the respective buyer based on a capacity matrix and based on a number of available slots.

3. The method of managing the delivery schedule as recited in claim 1, further comprising the step of getting a zip code to which the order is to be delivered and a brand of a respective good in the order.

4. The method of managing the delivery schedule as recited in claim 3, further comprising the step of getting the supplier ship schedule based on the zip code and the brand of the respective good ordered.

5. The method of managing the delivery schedule as recited in claim 4, further comprising the step of selecting the respective delivery agent and a respective capacity matrix based on the zip code of the order.

6. The method of managing the delivery schedule as recited in claim 5, further comprising the step of determining a first potential ship date to the respective buyer's address based on the capacity of the respective delivery agent and the delivery schedule of the respective delivery agent.

7. The method of managing the delivery schedule as recited in claim 1, wherein the step of allowing an order change that affects the delivery date of the order to be made further comprises the step of allowing the order change to be made using an external order interface.

8. The method of managing the delivery schedule as recited in claim 1, further comprising the step of updating the electronic manifest with status information.

9. The method of managing the delivery schedule as recited in claim 1, wherein the step of calculating a first potential arrival date of the order to a respective delivery agent's location further comprises calculating a first potential arrival date of the order, wherein the order information comprises the order request date, a model number, a quantity of items, a brand of an item, a service to be selected, a requested delivery date, the respective buyer's delivery address, a security level clearance, and status information.

10. A method of managing a delivery schedule of an order using a system configured with a server which includes a goods delivery system, the system including at least one computing unit networked to the server, the order being delivered from at least one supplier to a respective delivery agent, and from the respective delivery agent to a respective buyer, wherein the order comprises order information, said method comprising the steps of:
    (1) calculating a first potential arrival date of the order to a respective delivery agent's location using the server system networked to the computing unit based on an order request date, a respective buyer's address, and a fixed delay;
    (2) generating a work unit matrix, wherein each work unit in the work unit matrix is a multiplication factor of a size and a degree of difficulty of installation associated with each item in the order;
    (3) determining a number of delivery slots needed for the order by multiplying each item in the order by a work unit selected from the work unit matrix;
    (4) determining an ability of the respective delivery agent to ship the order within a set of potential delivery dates based on the first potential arrival date, a first date the respective delivery agent is prepared to ship the order, and a number of slots available for shipping the order;
    (5) selecting an actual delivery date from the set of potential delivery dates;
    (6) updating an electronic manifest indicating the actual delivery date of the order and a change in delivery agent capacity for the delivery date; and
    (7) determining whether an order change that affects the delivery date of the order has been requested, wherein the request is made by a user that is authorized by one of the respective delivery agent, the respective buyer, the at least one supplier, a store, or a logistics intermediary, wherein allowance of the order change is based on: (a) a type of order change, (b) whether the user is acting as the respective delivery agent, the respective buyer, the at least one supplier, the store, or the logistics intermediary, (c) a level of the user, and (d) a security code, wherein, upon allowance of the order change, steps (1), (2), (3), (4), (5), and (6) are repeated to determine a new delivery date.

11. The method of managing the delivery schedule as recited in claim 10, wherein the step of selecting an actual delivery date from the set of potential delivery dates further comprises the step of determining a first available date to completely ship the order to the respective buyer based on a capacity matrix and based on a number of available slots.

12. The method of managing the delivery schedule as recited in claim 10, further comprising the step of getting a zip code to which the order is to be delivered and a brand of a respective good in the order.

13. The method of managing the delivery schedule as recited in claim 12, further comprising the step of getting the respective supplier ship schedule based on the zip code and the brand of the respective good ordered.

14. The method of managing the delivery schedule as recited in claim 13, further comprising the step of selecting the respective delivery agent and a respective capacity matrix based on the zip code of the order.

15. The method of managing the delivery schedule as recited in claim 14, further comprising the step of determining a first potential ship date to the respective buyer's address based on the capacity of the respective delivery agent and a delivery schedule of the respective delivery agent.

16. The method of managing the delivery schedule as recited in claim 10, wherein the step of calculating a first potential arrival date of the order to a respective delivery agent's location further comprises calculating a first potential arrival date of the order, wherein the order information comprises the order request date, a model number, a quantity of items, a brand of an item, a service to be selected, a requested delivery date, the respective buyer's delivery address, a security level clearance, and status information.

17. A computer program product comprising a computer readable medium having computer readable program instructions for managing deliveries of a goods delivery system, the system employed to deliver an order from at least one supplier to a respective delivery agent, and from the respective delivery agent to a respective buyer, given order information, said computer readable program instructions comprising the steps of:
(1) determining a first potential arrival date of the order to a respective delivery agent's location, based on an order request date, a respective buyer's address, and a fixed delay;
(2) generating a work unit matrix, wherein each work unit in the work unit matrix is a multiplication factor of a size and a degree of difficulty of installation associated with each item in the order;
(3) determining a number of delivery slots needed for the order by multiplying each item in the order by a work unit selected from the a work unit matrix;
(4) determining an ability of the respective delivery agent to ship the order based on the first potential arrival date and a number of slots;
(5) determining a delivery date to the respective buyer when there is sufficient delivery agent capacity to ship the order to the respective buyer's address;
(6) updating an electronic manifest indicating the delivery date of the order and a change in delivery agent capacity for the delivery date; and
(7) determining whether an order change that affects the delivery date of the order has been requested, wherein the request is made by a user that is authorized by one of the respective delivery agent, the respective buyer, the at least one supplier, a store, or a logistics intermediary, wherein allowance of the order change is based on: (a) a type of order change, (b) whether the user is acting as the respective delivery agent, the respective buyer, the at least one supplier, the store, or the logistics intermediary, (c) a level of the user, and (d) a security code, wherein, upon allowance of the order change, steps (1), (2), (3), (4), (5), and (6) are repeated to determine a new delivery date.

18. The computer process as recited in claim 17, wherein the step of determining a delivery date to the respective buyer when there is sufficient capacity to ship the order further comprises the step of determining a first available date to completely ship the order to the respective buyer based on a capacity matrix and based on the number of available slots.

19. The computer process as recited in claim 17, further comprising the step of getting a zip code to which the order is to be delivered and a brand of a respective good in the order.

20. The computer process as recited in claim 19, further comprising the step of getting the supplier ship schedule based on the zip code and the brand of the respective good ordered.

21. The computer process as recited in claim 20, further comprising the step of selecting the respective delivery agent and a respective capacity matrix based on the zip code of the order.

22. The computer process as recited in claim 21, further comprising the step of determining a first potential ship date to the respective buyer's address based on the capacity of the respective delivery agent and the delivery schedule of the respective delivery agent.

23. The computer process as recited in claim 17, wherein the step of allowing an order change that affects the delivery date of the order to be made further comprises the step of allowing the order change to be made using an external order interface.

24. The computer process as recited in claim 23, further comprising the step of updating the electronic manifest with status information.

25. The computer process as recited in claim 17, wherein the step of determining a first potential arrival date of the order to a respective delivery agent's location further comprises determining a first potential arrival date of the order, wherein the order information comprises the order request date, a model number, a quantity of items, a brand of an item, a service to be selected, a requested delivery date, the respective buyer's delivery address, a security level clearance, and status information.

26. An apparatus for managing the delivery of an order from at least one supplier to a respective delivery agent, and from the respective delivery agent to a respective buyer, given order information, said apparatus comprising:
means for determining a first potential arrival date of the order to a respective delivery agent's location, based on an order request date, a respective buyer's address, and a fixed delay;
means for generating a work unit matrix, wherein each work unit in the work unit matrix is a multiplication factor of a size and a degree of difficulty of installation associated with each item in the order;
means for determining a number of delivery slots needed for the order by multiplying each item in the order by a work unit selected from the work unit matrix;
means for determining an ability of the respective delivery agent to ship the order based on the first potential arrival date and a number of slots available for shipping the order;
means for determining a delivery date to the respective buyer when there is sufficient delivery agent capacity to ship the order to the respective buyer's address;
means for updating an electronic manifest indicating an order ship date and a change in delivery agent capacity for the delivery date; and
means for determining whether an order change that affects the delivery date of the order has been requested, wherein the request is made by a user that is authorized by one of the respective delivery agent, the respective buyer, the at least one supplier, a store, or a logistics intermediary, wherein allowance of the order change is based on:

(a) a type of order change, (b) whether the user is acting as the respective delivery agent, the respective buyer, the at least one supplier, the store, or the logistics intermediary, (c) a level of the user, and (d) a security code, wherein, upon allowance of the order change, said apparatus determines a new delivery date and updates the electronic manifest.

27. A method of managing a delivery schedule of a multiple brand order using a system configured with a server which includes a goods delivery system, the system including at least one computing unit networked to the server, the multiple brand order being delivered from at least two suppliers to a respective delivery agent, and from the respective delivery agent to a respective buyer, wherein the multiple brand order comprises order information, said method comprising the steps of:

(1) calculating a first potential arrival date of the multiple brand order to a respective delivery agent's location using the server system networked to the computing unit based on an order request date, a respective buyer's address, and a fixed delay;

(2) generating a work unit matrix, wherein each work unit in the work unit matrix is a multiplication factor of a size and a degree of difficulty of installation associated with each item in the order:

(3) determining a number of delivery slots needed for the order by multiplying each item in the order by. a work unit Selected from a work unit matrix;

(4) determining an ability of the respective delivery agent to ship the multiple brand order from the at least two suppliers based on the first potential arrival date and a number of slots available for shipping the order;

(5) determining a delivery date to the respective buyer when there is sufficient delivery agent capacity to ship the multiple brand order to the respective buyer's address;

(6) updating an electronic manifest indicating the delivery date of the multiple brand order and a change in delivery agent capacity for the delivery date; and (7) determining whether an order change that affects the delivery date of the order has been requested, wherein the request is made by a user that is authorized by one of the respective delivery agent, the respective buyer, the at least two suppliers, a store, or a logistics intermediary, wherein allowance of the order change is based on: (a) a type of order change, (b) whether the user is acting as the respective delivery agent, the respective buyer, one of the at least two suppliers, the store, or the logistics intermediary, (c) a level of the user, and (d) a security code, wherein, upon allowance of the order change, steps (1), (2), (3), (4), (5), and (6) are repeated to determine a new delivery date.

28. The method of managing the delivery schedule as recited in claim 27, wherein the step of determining a delivery date to the respective buyer when there is sufficient capacity to ship the multiple brand order further comprises the step of determining a first available date to completely ship the multiple brand order to the respective buyer based on a capacity matrix and based on the number of available slots.

29. The method of managing the delivery schedule as recited in claim 27, further comprising the step of getting a zip code to which the multiple brand order is to be delivered and a brand of at least one respective good in the multiple brand order.

30. The method of managing the delivery schedule as recited in claim 29, further comprising the step of getting each of the supplier ship schedules based on the zip code and the brand of the at least one respective good ordered.

31. The method of managing the delivery schedule as recited in claim 30, further comprising the step of selecting the respective delivery agent and the respective capacity matrix based on the zip code of the multiple brand order.

32. The method of managing the delivery schedule as recited in claim 31, further comprising the step of determining a first potential ship date to the respective buyer's address based on the capacity of the respective delivery agent and the delivery schedule of the respective delivery agent.

33. A method of managing a delivery schedule of a multiple brand order using a system configured with a server which includes a goods delivery system, the system including at least one computing unit networked to the server, the order being delivered from at least two suppliers to a respective delivery agent, and from the respective delivery agent to a respective buyer, wherein the multiple brand order comprises order information, said method comprising the steps of:

(1) calculating a first potential arrival date of the multiple brand order to a respective delivery agent's location using the server system networked to the computing unit based on an order request date, a respective buyer's address, and a fixed delay;

(2) generating a work unit matrix, wherein each work unit in the work unit matrix is a multiplication factor of a size and a degree of difficulty of installation associated with each item in the order;

(3) determining a number of deliver,/ slots needed for the order by multiplying each item in the order by a work unit selected from a work unit matrix;

(4) determining an ability of the respective delivery agent to ship the multiple brand order from the at least two suppliers based on the first potential arrival date and a number of slots available for shipping the order;

(5) determining a delivery date to the respective buyer when there is sufficient delivery agent capacity to ship the multiple brand order to the respective buyer's address;

(6) updating an electronic manifest indicating the delivery date of the multiple brand order and a change in delivery agent capacity for the delivery date; and (7) determining whether an order change that affects the delivery date of the order has been requested, wherein the request is made by a user that is authorized by one of the respective delivery agent, the respective buyer, the at least two suppliers, a store, or a logistics intermediary, wherein allowance of the order change is based on: (a) a type of order change, (b) whether the user is acting as the respective delivery agent, the respective buyer, one of the at least two suppliers, the store, or the logistics intermediary, (c) a level of the user, and (d) a security code, wherein, upon allowance of the order change, steps (1), (2), (3), (4), (5), and (6) are repeated to determine a new delivery date.

34. The method of managing the delivery schedule as recited in claim 33, wherein the step of determining a delivery date to the respective buyer when there is sufficient capacity to ship the multiple brand order further comprises the step of determining a first available date to completely ship the multiple brand order to the respective buyer based on a capacity matrix and based on the number of available slots.

35. The method of managing the delivery schedule as recited in claim 33, further comprising the step of getting a zip code to which the multiple brand order is to be delivered and a brand of at least one respective good in the multiple brand order.

36. The method of managing the delivery schedule as recited in claim 35, further comprising the step of getting each of the supplier ship schedule based on the zip code and the brand of the at least one respective good ordered.

37. The method of managing the delivery schedule as recited in claim 36, further comprising the step of selecting the respective delivery agent and the respective capacity matrix based on the zip code of the multiple brand order.

38. The method of managing the delivery schedule as recited in claim 37, further comprising the step of determining a first potential ship date to the respective buyer's address based on the capacity of the respective delivery agent and the delivery schedule of the respective delivery agent.

* * * * *